(12) United States Patent
Jung

(10) Patent No.: US 8,608,140 B2
(45) Date of Patent: Dec. 17, 2013

(54) DUST REMOVING AND COOLING APPARATUS

(76) Inventor: Jae Ouk Jung, Yangsan-si (KR)

( * ) Notice: Subject to any disclaimer, the term of this patent is extended or adjusted under 35 U.S.C. 154(b) by 530 days.

(21) Appl. No.: 12/996,708

(22) PCT Filed: Feb. 27, 2009

(86) PCT No.: PCT/KR2009/000964
§ 371 (c)(1),
(2), (4) Date: Dec. 7, 2010

(87) PCT Pub. No.: WO2009/151199
PCT Pub. Date: Dec. 17, 2009

(65) Prior Publication Data
US 2011/0089583 A1   Apr. 21, 2011

(30) Foreign Application Priority Data

Jun. 9, 2008  (KR) .................. 10-2008-0053608

(51) Int. Cl.
*B01F 3/04* (2006.01)
(52) U.S. Cl.
USPC ........... 261/147; 261/151; 261/29; 261/112.1
(58) Field of Classification Search
USPC ............ 261/147, 151, 29, 112.1, 116, DIG. 9
See application file for complete search history.

(56) References Cited

U.S. PATENT DOCUMENTS

| | | | | |
|---|---|---|---|---|
| 2,484,277 A | * | 10/1949 | Fisher | 96/262 |
| 2,585,440 A | * | 2/1952 | Collins | 96/237 |
| 3,085,793 A | * | 4/1963 | Pike et al. | 261/112.1 |
| 3,456,928 A | * | 7/1969 | Selway | 261/22 |
| 3,516,230 A | * | 6/1970 | Saubesty | 96/238 |
| 4,299,602 A | * | 11/1981 | Cordier et al. | 96/325 |
| 4,350,506 A | * | 9/1982 | Otto | 96/323 |
| 4,729,775 A | * | 3/1988 | Patte et al. | 96/325 |
| 4,738,224 A | * | 4/1988 | Bruckner et al. | 122/7 R |
| 6,036,756 A | * | 3/2000 | Gohara et al. | 96/297 |
| 6,808,166 B2 | * | 10/2004 | Hargrove et al. | 261/116 |
| 2004/0207102 A1 | * | 10/2004 | Sugimori et al. | 261/112.1 |

FOREIGN PATENT DOCUMENTS

| | | |
|---|---|---|
| JP | 10-047649 | 2/1998 |
| JP | 11-165025 | 6/1999 |
| KR | 10-1999-0073565 | 10/1999 |
| KR | 10-2008-0011494 | 2/2008 |

* cited by examiner

*Primary Examiner* — Charles Bushey
(74) *Attorney, Agent, or Firm* — Sherr & Jiang, PLLC

(57) ABSTRACT

A dust removing and cooling apparatus is provided. High temperature dust-containing harmful gases are exhausted in a state where 99.9% of airborne particulates are removed from the high temperature dust-containing harmful gases at a temperature that is similar to the air so that dust collecting efficiency is very high and white plume can be avoided.

11 Claims, 4 Drawing Sheets

DUST REMOVING AND COOLING APPARATUS

CROSS REFERENCE TO PRIOR APPLICATIONS

This application is a National Stage Patent Application of PCT International Patent Application No. PCT/KR2009/000964 (filed on Feb. 27, 2009) under 35 U.S.C. §371, which claims priority to Korean Patent Application No. 10-2008-0053608 (filed on Jun. 9, 2008), which are all hereby incorporated by reference in their entirety.

TECHNICAL FIELD

The present invention relates to a dust removing and cooling apparatus which has very high dust collecting efficiency and prevents white plume from occurring.

BACKGROUND ART

In industrial boilers and incinerators in which waste oil, various garbage, etc, that are environment contaminating materials, as well as a variety of fuels are used as a heat source or are incinerated, much harmful gases, exhaust gas, and a variety of foreign substances are exhausted during combustion or incineration, and waste gas and exhaust gas allow air pollution to be greatly accelerated and thus destroy an ecosystem and infringe several fields of the human life.

Thus, in order to prevent air pollution, various exhaust gases, airborne particulates, etc. that occur during combustion or incineration are filtrated and captured by installing filtration devices, cyclones, etc. at a variety of boilers or incinerators. Filtration devices or cyclones filtrate comparatively large foreign substances but do not capture various gasified harmful gases, etc. as well as exhaust gas having slightly small particles and are not efficient. As such, there is a limitation in preventing air pollution. In particular, high temperature dust-containing harmful gases are exhausted in a state where airborne particulates are removed from only a portion of the high temperature dust-containing harmful gases. As a result, air pollution and white plume occur.

DETAILED DESCRIPTION OF THE INVENTION

Technical Problem

The present invention provides a dust removing and cooling apparatus in which high temperature dust-containing harmful gases are exhausted in a state where 99.9% of airborne particulates are removed from the high temperature dust-containing harmful gases at a temperature that is similar to the air so that dust collecting efficiency is very high and white plume can be prevented from occurring.

Technical Solution

According to an aspect of the present invention, there is provided a dust removing and cooling apparatus including: a body comprising a first storage space in which water is stored and a second storage space in which a lower portion of the body communicates with the first storage space, wherein an inlet that communicates with the first storage space and an outlet that communicates with the second storage space are formed in an upper portion of the body; a water tank disposed in the first storage space and below the inlet; a first water flow sheet which is disposed below the water tank and has a tapered shape that becomes gradually narrower towards a lower portion of the first water flow sheet, and in which a first discharge hole is formed on a lower end of the first water flow sheet; a mixture tube disposed below the first discharge hole; a dust collecting and cooling portion which is disposed below the mixture tube, has a tapered shape that becomes gradually narrower towards a lower portion of the dust collecting and cooling portion and comprises a second water flow sheet in which a second discharge hole is formed on a lower end of the second water flow sheet; a gas inflow portion connected to the inlet and allowing contaminated harmful gases to be flowed into the first storage space; a water circulation portion having one end connected to an upper portion of the body and the other end connected to a lower portion of the body and pumping water stored in the lower portion of the first storage space into the upper portion of the first storage space; and a gas exhaust portion generating a suction force in a state where the gas exhaust portion is connected to the outlet and allowing gas stored in the second storage space to be exhausted as water stored in the first storage space rises into the second storage space due to an internal pressure differential between the first storage space and the second storage space.

A plurality of first water flow sheets, a plurality of mixture tubes, and a plurality of second water flow sheets may be disposed.

The dust collecting and cooling portion may further include: a nozzle communicating with the first storage space, disposed below the second storage space and allowing harmful gases within the first storage space to quickly flow a gradually-decreasing path due to the operation of the gas exhaust portion and to be sprayed as water that is risen into the second storage space so that dust collecting and cooling can be performed; and a collision sheet disposed on the nozzle and allowing the harmful gases sprayed through the nozzle to collide with the collision sheet and to be formed as minute air drops.

The collision sheet may be formed in a multiple stage at a predetermined distance along a proceeding direction of the harmful gases sprayed through the nozzle.

The apparatus may further include a waste water circulation portion including: a discharge line which is connected to a lower portion of the body and through which water in the lower portion of the first storage space is discharged; a sinking tank connected to the discharge line and allowing water discharged by the discharge line to be flowed into the sinking tank; a pump connected to the sinking tank and allowing water in the sinking tank to be discharged; a filtration tank connected to the pump, allowing water discharged from the sinking tank to be supplied to the inside of the filtration tank, and comprising a filtration bag that filtrates water; and a remaining liquid pump connected to the filtration tank and an upper portion of the body and allowing water filtrated by the filtration tank to be pumped into an upper portion of the first storage space.

The apparatus may further include an air inflow portion connected to the gas exhaust portion and allowing outdoor air to be flowed into the gas exhaust portion.

The gas inflow portion may include: an airborne particulate removing body comprising an internal space into which the contaminated harmful gases are flowed, and a collision sheet which is disposed in the internal space and with which the in-flowed harmful gases collide; an airborne particulate sinking tube connected to a lower end of the airborne particular removing body so that the airborne particulates within the airborne particulate removing body are sunk due to gravity and are stored; and a movement line having one end connected to an upper portion of the airborne particulate removing body, and the other end connected to the inlet so that harmful gases from which airborne particulates are primarily removed by the airborne particulate removing body, move to the inlet through the movement line.

ADVANTAGEOUS EFFECTS

The dust removing and cooling apparatus according to the present invention has the following effects.

High temperature dust-containing harmful gases are exhausted in a state where 99.9% of airborne particulates of the high temperature dust-containing harmful gases are removed, at a temperature that is similar to the air so that dust collecting efficiency is very high and white plume can be prevented from occurring.

In addition, waste water of a dust collecting and cooling portion is filtrated and is re-used so that the amount of water can be reduced and costs can be reduced.

Meanwhile, the contaminated air is sprayed and flowed into water, and an eddy flow phenomenon occurs in air drops so that foreign substances and minute dust included in the contaminated air can be easily filtrated.

Furthermore, the air drops of the contaminated air that are sprayed and flowed into water collide with a plurality of interception sheets and are formed as minute air drops so that foreign substances and minute dust are filtrated again and filtration efficiency can be enhanced.

BEST MODE

The present invention will now be described more fully with reference to the accompanying drawings, in which exemplary embodiments of the invention are shown. First, terms or words used in the present specification and the claims should not be construed as being limited to general or literal meaning, and the inventor should construe his/her own invention in meaning and concept that coincide with the technical spirit of the invention based on the principle for properly defining the concept of the terms so as to describe his/her own invention in the best manner.

Thus, configurations shown in embodiments and the drawings of the present invention rather is an example of the most exemplary embodiment and does not represent all of the technical spirit of the invention. Thus, it will be understood that various equivalents and modifications that replace the configurations are possible when filing the present application.

Figure 1:
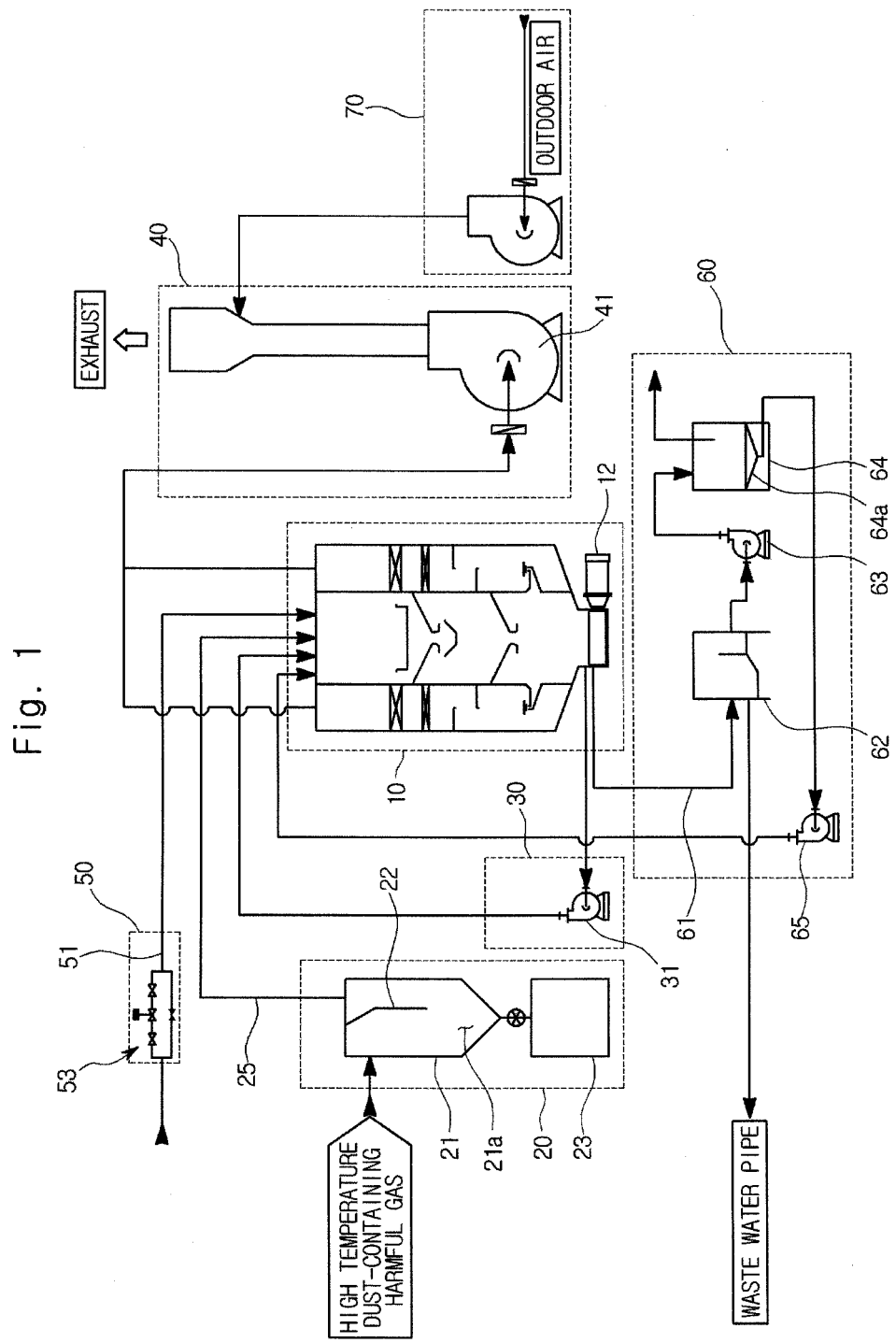
FIG. 1 schematically illustrates a dust removing and cooling apparatus according to an embodiment of the present invention.

FIG. 1 schematically illustrates a dust removing and cooling apparatus according to an embodiment of the present invention. As illustrated in FIG. 1, the dust removing and cooling apparatus according to the current embodiment includes a dust collecting and cooling portion 10, a gas inflow portion 20, a water circulation portion 30, a gas exhaust portion 40, a waste water circulation portion 60, and an air inflow portion 70.

Figure 2:
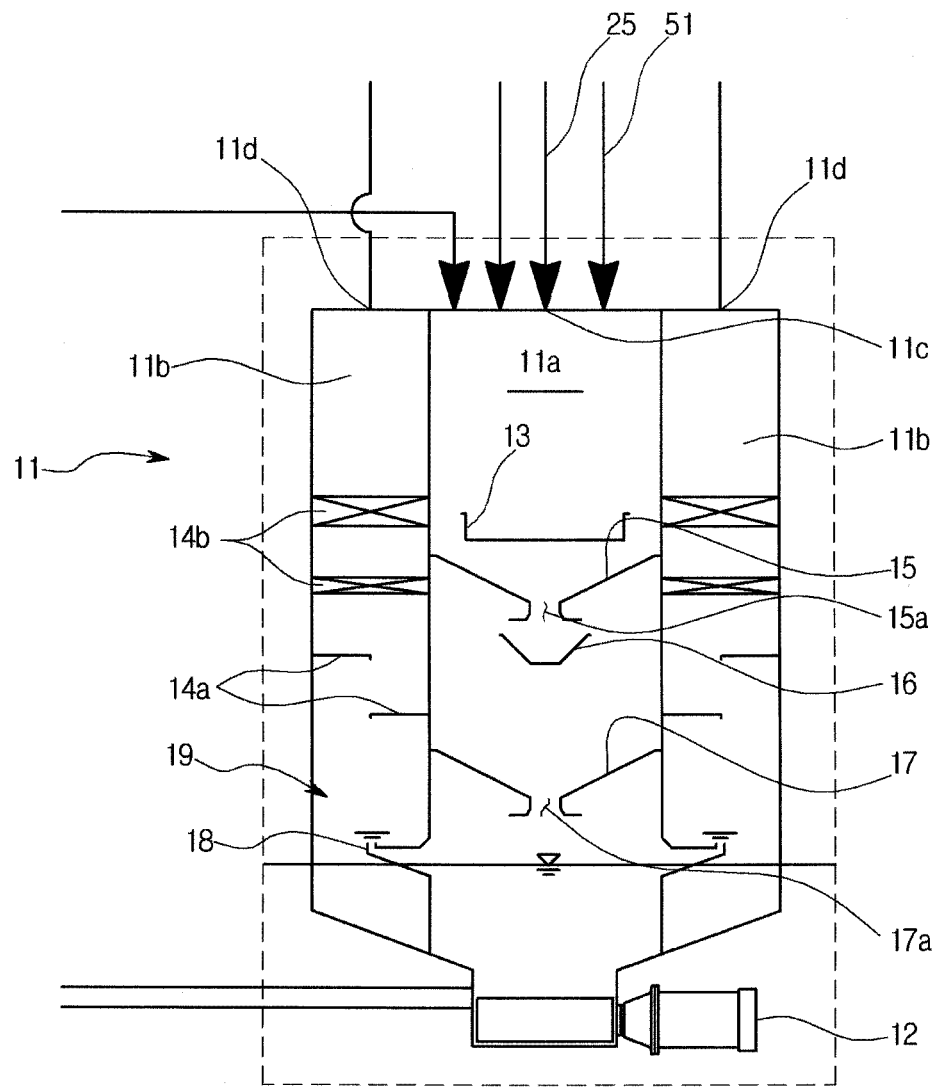
FIGS. 2 and 3 are enlarged cross-sectional views of a dust collecting and cooling portion illustrated in FIG. 1.
Figure 3:
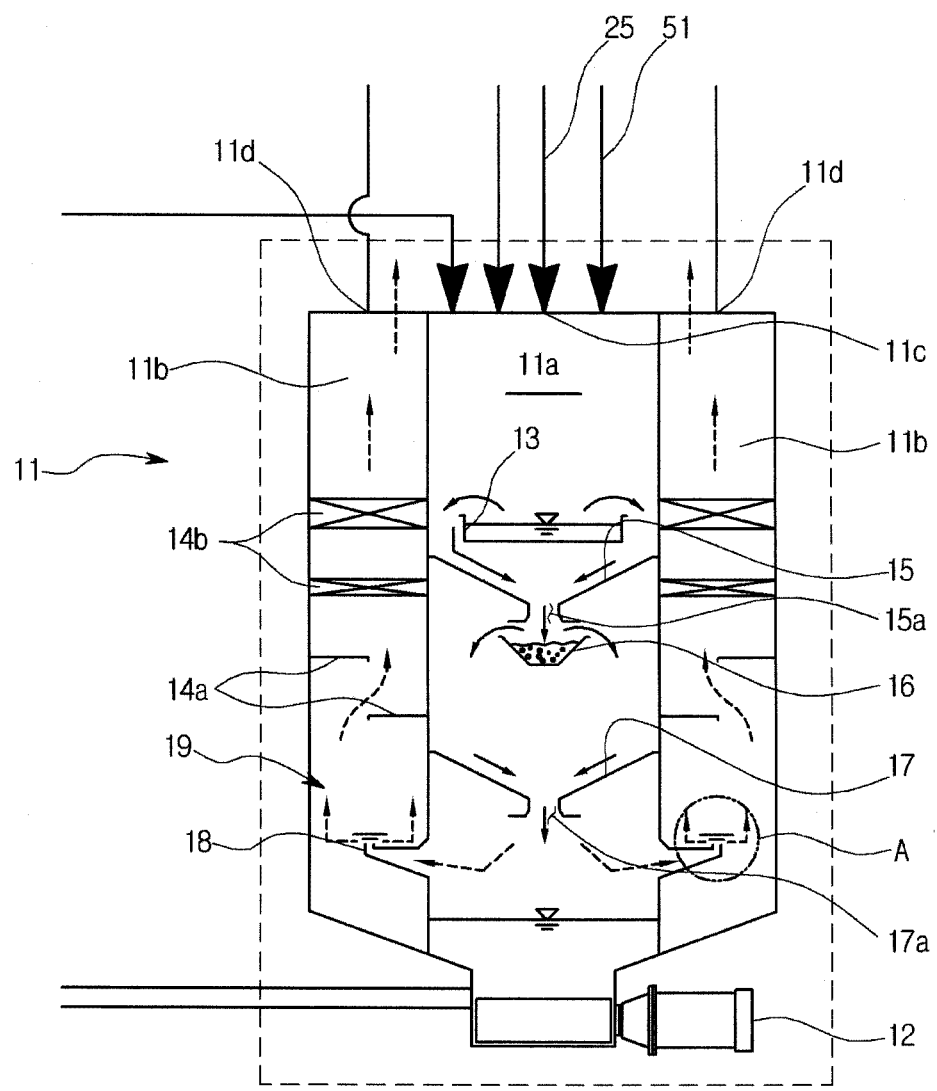

First, the dust collecting and cooling portion 10 includes a body 11, a water tank 13, a first water flow sheet 15, a mixture tube 16, a second water flow sheet 17, a nozzle 18, and a collision sheet 19, as illustrated in FIG. 2.

A first storage space 11a in which water is stored is disposed in the body 11. A second storage space 11b in which a lower portion of the body 11 communicates with the first storage space 11a is disposed in the body 11. An inlet 11c that communicates with the first storage space 11a and an outlet 11d that communicates with the second storage space are disposed on an upper portion of the body 11.

In addition, a water supply portion 50 is connected to an upper portion of the body 11. The water supply portion 50 supplies water to the first storage space 11a in communication with the first storage space 11a. The water supply portion 50 may include a supply line 51 through which water moves, and a valve 53 which controls the amount of water supply, as illustrated in FIG. 1.

The water tank 13 is disposed in the first storage space 11a, that is, in a lower portion of the inlet 11c, as illustrated in FIG. 2. The shape of the water tank 13 illustrated in the drawings of the specification is just an embodiment. The shape of the water tank 13 may be all of shapes in which water is stored.

The first water flow sheet 15 is disposed below the water tank 13 and has a tapered shape that becomes gradually narrower towards the lower portion of the first water flow sheet 15. A first discharge hole 15a through which harmful gases contaminated are discharged with water, is formed on a lower end of the first water flow sheet 15.

The mixture tube 16 is disposed below the first discharge hole 15a. Water and the harmful gases contaminated, which are discharged together through then first discharge hole 15a, are primarily, forcibly mixed within the mixture tube 16.

The second water flow sheet 17 is disposed below the mixture tube 16 and has a tapered shape that becomes gradually narrower towards the lower portion of the second water flow sheet 17. A second discharge hole 17a is formed on a lower end of the second water flow sheet 17.

In the current embodiment, a first water flow sheet 15, a mixture tube 16, and a second water flow sheet 17 are described. However, a plurality of first water flow sheets 15, a plurality of mixture tubes 16, and a plurality of second water flow sheets 17 may be disposed and may be constituted in a multiple stage.

The nozzle 18 communicates with the first storage space 11a and is disposed below the second storage space 11b. The nozzle 18 allows the harmful gases within the first storage space 11a to quickly flow a gradually-decreasing path due to the operation of the gas exhaust portion 40 and to be sprayed as water that is risen into the second storage space 11b so that dust collecting and cooling can be performed.

The collision sheet 19 is disposed on the nozzle 18. The collision sheet 19 allows the harmful gases sprayed through the nozzle 18 to collide with the collision sheet 19 and to be formed as minute air drops.

Figure 4:
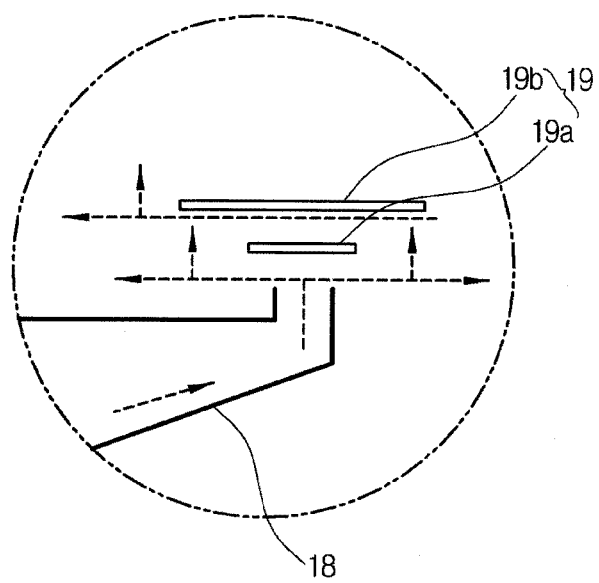
FIG. 4 is an enlarged view of portion A of FIG. 3.

In the current embodiment, the collision sheet 19 includes a two-sheet structure of first and second collision sheets 19a and 19b, as illustrated in FIG. 4. In addition, in the current embodiment, the second collision sheet 19b has a width larger than that of the first collision sheet 19a. However, this is just an example. The width of the first collision sheet 19a and the width of the second collision sheet 19b may be same, and the number of collision sheets 19 may be changed according to exemplary embodiments.

An interception sheet 14a which intercepts water and a water drop removing layer 14b which is formed of stainless steel, are disposed above the collision sheet 19.

Meanwhile, the gas inflow portion 20 is connected to the inlet 11c of the body 11 so that high temperature (120° C.-150° C.) contaminated harmful gases can be flowed into the first storage space 11, as illustrated in FIG. 1.

The gas inflow portion 20 may include an airborne particulate removing body 21, an airborne particulate sinking tube 23, and a movement line 25.

The airborne particulate removing body 21 includes an internal space 21a into which the high temperature contaminated harmful gases are flowed, and a collision sheet 22 which is disposed in the internal space 21a and with which the in-flowed harmful gases collide. In other words, the high temperature contaminated harmful gases are flowed into the internal space 21a of the airborne particulate removing body 21 and collide with the collision sheet 22 so that a portion of airborne particulates is primarily removed.

The airborne particulate sinking tube 23 is connected to a lower end of the airborne particular removing body 21 so that the airborne particulates within the airborne particulate removing body 21 are sunk due to gravity and are stored.

One end of the movement line 25 is connected to an upper portion of the airborne particulate removing body 21, and the other end of the movement line 25 is connected to the inlet 11c so that harmful gases from which airborne particulates are primarily removed by the airborne particulate removing body 21, move to the inlet 11c through the movement line 25.

Meanwhile, one end of the water circulation portion 30 is connected to an upper portion of the body 11, and the other end of the water circulation portion 30 is connected to a lower portion of the body 11 so that water stored in a lower portion of the first storage space 11a is pumped into an upper portion of the first storage space 11a. The water circulation portion 30 includes a circulation pump 31 which pumps water. In other words, water stored in the lower portion of the first storage space 11a is pumped by the circulation pump 31 into the upper portion of the first storage space 11a so that water stored in the first storage space 11a is continuously circulated.

The gas exhaust portion 40 includes an exhaust pan 41 and generates a suction force in a state where the gas exhaust portion 40 is connected to the outlet 11d and allows gas stored in the second storage space 11b to be exhausted as water stored in the first storage space 11a rises into the second storage space 11b due to an internal pressure differential between the first storage space 11a and the second storage space 11b.

The waste water circulation portion 60 includes a discharge line 61, a sinking tank 62, a pump 63, a filtration tank 64, and a remaining liquid pump 65.

The discharge line 61 is connected to the lower portion of the body 11. Water stored in the lower portion of the first storage space 11a is discharged through the discharge line 61.

The sinking tank 62 is connected to the discharge line 61 and allows water discharged by the discharge line 61 to be flowed into the sinking tank 62.

The pump 63 is connected to the sinking tank 62 and allows water in the sinking tank 62 to be discharged.

The filtration tank 64 is connected to the pump 63 and allows water discharged from the sinking tank 62 to be supplied to the inside of the filtration tank 64. The filtration tank 64 includes a filtration bag 64a which filtrates water.

The remaining liquid pump 65 is connected to the filtration tank 64 and the upper portion of the body 11 and allows water filtrated by the filtration tank 64 to be pumped into the upper portion of the first storage space 11a.

The air inflow portion 70 is connected to the gas exhaust portion 40 and allows the air to be flowed into the gas exhaust portion 40.

Hereinafter, the operating state of the dust removing and cooling apparatus having the above structure according to the present invention will be described with reference to FIG. 1.

First, water is stored by the water supply portion 50 in the first storage space 11a and the second storage space 11b of the body 11, as illustrated in FIG. 2. When the exhaust pan 41 of the gas exhaust portion 40 operates in this state, the second storage space 11b is kept in a vacuum state so that an atmospheric pressure differential between the first storage space 11a and the second storage space 11b occurs. Due to the internal pressure differential, a level of water stored in the first storage space 11a is decreased, and a level of water stored in the second storage space 11b is increased.

In this case, an atmospheric pressure in the first storage space 11a becomes lower than the outside, and the harmful gases enter into the first storage space 11a through the inlet 11c at high speed.

A portion of airborne particulates, i.e., 50-60% of the harmful gases that enter into the inlet 11c is removed by the airborne particulate removing body 21. In other words, the high temperature (120° C.-150° C.) contaminated harmful gases are flowed into the internal space 21a of the airborne particulate removing body 21 and collide with the collision sheet 22 so that about 50-60% of the airborne particulates is removed. The harmful gases from which airborne particulates are primarily removed by the airborne particulate removing body 21, move through the movement line 25 and are flowed into the first storage space 11a through the inlet 11c.

When the exhaust pan 41 operates and simultaneously the circulation pump 31 of the water circulation portion 30 operates, water stored in the lower portion of the first storage space 11a is moved by the circulation pump 31 to the upper portion of the first storage space 11a.

Water delivered to the upper portion of the first storage space 11a drops and is supplied to the water tank 13 so that water is filled in the water tank 13.

Water filled in the water tank 13 is overflowed to the outside of the water tank 13, and the high temperature harmful gases that enter into the first storage space 11a through the inlet 11c pressurize water, and water and the harmful gases drop downwards together.

Water and the harmful gases which drop downwards are collected in the first water flow sheet 15 and are discharged through the first discharge hole 15a. The discharged water and harmful gases cause an eddy flow in the mixture tube 16 and are forcibly mixed, and the water and harmful gases contact and airborne particulates included in the harmful gases are permeated into water so that filtration and cooling can be simultaneously performed.

The harmful gases in which filtration and cooling with water that is forcibly mixed within the mixture tube 16 is performed, are overflowed and drop downwards.

The water and the harmful gases that drop downwards are collected in the second water flow sheet 17 and are discharged through the second discharge hole 17a.

The water into which foreign substances are permeated is collected in the lower portion of the first storage space 11a. The gases filtrated within the first storage space 11a are flowed into the nozzle 18 due to a pressure differential between the first storage space 11a and the second storage space 11b. Water stored in the second storage space 11b is sprayed in a state where the gases pass the nozzle 18 and flow velocity is rapidly increased.

In this case, an eddy flow phenomenon occurs in the gases, and the gases collide with the first collision sheet 19a in an air drop state and are dispersed and are formed as minute air drops. The air drops that collide with the first collision sheet 19a are risen into the second collision sheet 19b, collide with the second collision sheet 19*b*, and form minute air drops compared to the air drops formed by the first collision sheet 19*a*.

Thus, the air that passes the nozzle 18 and is sprayed into water, forms an eddy flow by using air drops so that foreign substances included in the gases are filtrated into water and again collide with the plurality of collision sheets 19 formed in a multiple stage and are deformed as minute air drops and foreign substances and minute dust included in the air drops are filtrated into water again.

The air drops that are filtrated into water rise above the surface of water in the second storage space 11*b*. The filtrated and cooled gases are discharged into the exhaust hole 11*d* due to a suction force of the exhaust pan 41.

As described above, 99.9% of the airborne particulates contained in the gases are removed by the dust collecting and cooling portion 10 and are cooled at about 25° C.-35° C.

The gases that are filtrated and cooled and are exhausted through the outlet 11*d* are exhausted through the gas exhaust portion 40.

In this case, the air inflow portion 70 is provided to the gas exhaust portion 40. The air inflow portion 70 allows the air to be flowed into the exhausted gases so that white plume can be prevented from occurring due to the exhausted gases mixed with the air.

Meanwhile, the foreign substances collected into the lower portion of the first storage space 11*a* may be discharged to the outside through a sludge discharge valve 12.

In addition, waste water in the lower portion of the first storage space 11*a* may be re-used by the waste water circulation portion 60. In the operation of the waste water circulation portion 60, water stored in the lower portion of the first storage space 11*a* is discharged through the discharge line 61, is flowed into the sinking tank 62, and is supplied by the pump 63 to the filtration tank 64. Water supplied to the filtration tank 64 is filtrated by the filtration bag 64*a*, and the filtrated water is pumped by the remaining liquid pump 65 into the upper portion of the first storage space 11*a* and is re-used.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A dust removing and cooling apparatus comprising:
   a body comprising a first storage space in which water is stored and a second storage space in which a lower portion of the body communicates with the first storage space, wherein an inlet that communicates with the first storage space and an outlet that communicates with the second storage space are formed in an upper portion of the body;
   a water tank disposed in the first storage space and below the inlet;
   a first water flow sheet which is disposed below the water tank and has a tapered shape that becomes gradually narrower towards a lower portion of the first water flow sheet, and in which a first discharge hole is formed on a lower end of the first water flow sheet;
   a mixture tube disposed below the first discharge hole;
   a dust collecting and cooling portion which is disposed below the mixture tube, has a tapered shape that becomes gradually narrower towards a lower portion of the dust collecting and cooling portion and comprises a second water flow sheet in which a second discharge hole is formed on a lower end of the second water flow sheet;
   a gas inflow portion connected to the inlet and allowing contaminated harmful gases to be flowed into the first storage space;
   a water circulation portion having one end connected to an upper portion of the body and the other end connected to a lower portion of the body and pumping water stored in the lower portion of the first storage space into the upper portion of the first storage space; and
   a gas exhaust portion generating a suction force in a state where the gas exhaust portion is connected to the outlet and allowing gas stored in the second storage space to be exhausted as water stored in the first storage space rises into the second storage space due to an internal pressure differential between the first storage space and the second storage space.

2. The apparatus of claim 1, wherein a plurality of first water flow sheets, a plurality of mixture tubes, and a plurality of second water flow sheets are disposed.

3. The apparatus of claim 1, wherein the dust collecting and cooling portion further comprises:
   a nozzle communicating with the first storage space, disposed below the second storage space and allowing harmful gases within the first storage space to quickly flow a gradually-decreasing path due to the operation of the gas exhaust portion and to be sprayed as water that is risen into the second storage space so that dust collecting and cooling can be performed; and
   a collision sheet disposed on the nozzle and allowing the harmful gases sprayed through the nozzle to collide with the collision sheet and to be formed as minute air drops.

4. The apparatus of claim 3, wherein the collision sheet is formed in a multiple stage at a predetermined distance along a proceeding direction of the harmful gases sprayed through the nozzle.

5. The apparatus of claim 1, further comprising a waste water circulation portion comprising:
   a discharge line which is connected to a lower portion of the body and through which water in the lower portion of the first storage space is discharged;
   a sinking tank connected to the discharge line and allowing water discharged by the discharge line to be flowed into the sinking tank;
   a pump connected to the sinking tank and allowing water in the sinking tank to be discharged;
   a filtration tank connected to the pump, allowing water discharged from the sinking tank to be supplied to the inside of the filtration tank, and comprising a filtration bag that filtrates water; and
   a remaining liquid pump connected to the filtration tank and an upper portion of the body and allowing water filtrated by the filtration tank to be pumped into an upper portion of the first storage space.

6. The apparatus of claim 1, further comprising an air inflow portion connected to the gas exhaust portion and allowing outdoor air to be flowed into the gas exhaust portion.

7. The apparatus of claim 1, wherein the gas inflow portion comprises:
   an airborne particulate removing body comprising an internal space into which the contaminated harmful gases are flowed, and a collision sheet which is disposed in the internal space and with which the in-flowed harmful gases collide;
   an airborne particulate sinking tube connected to a lower end of the airborne particulate removing body so that the airborne particulates within the airborne particulate removing body are sunk due to gravity and are stored; and a movement line having one end connected to an upper portion of the airborne particulate removing body, and the other end connected to the inlet so that harmful gases from which airborne particulates are primarily removed by the airborne particulate removing body, move to the inlet through the movement line.

8. The apparatus of claim 2, wherein the dust collecting and cooling portion further comprises:

a nozzle communicating with the first storage space, disposed below the second storage space and allowing harmful gases within the first storage space to quickly flow a gradually-decreasing path due to the operation of the gas exhaust portion and to be sprayed as water that is risen into the second storage space so that dust collecting and cooling can be performed; and a collision sheet disposed on the nozzle and allowing the harmful gases sprayed through the nozzle to collide with the collision sheet and to be formed as minute air drops.

9. The apparatus of claim 2, further comprising a waste water circulation portion comprising:

a discharge line which is connected to a lower portion of the body and through which water in the lower portion of the first storage space is discharged;

a sinking tank connected to the discharge line and allowing water discharged by the discharge line to be flowed into the sinking tank;

a pump connected to the sinking tank and allowing water in the sinking tank to be discharged;

a filtration tank connected to the pump, allowing water discharged from the sinking tank to be supplied to the inside of the filtration tank, and comprising a filtration bag that filtrates water; and a remaining liquid pump connected to the filtration tank and an upper portion of the body and allowing water filtrated by the filtration tank to be pumped into an upper portion of the first storage space.

10. The apparatus of claim 2, further comprising an air inflow portion connected to the gas exhaust portion and allowing outdoor air to be flowed into the gas exhaust portion.

11. The apparatus of claim 2, wherein the gas inflow portion comprises:

an airborne particulate removing body comprising an internal space into which the contaminated harmful gases are flowed, and a collision sheet which is disposed in the internal space and with which the in-flowed harmful gases collide;

an airborne particulate sinking tube connected to a lower end of the airborne particulate removing body so that the airborne particulates within the airborne particulate removing body are sunk due to gravity and are stored; and a movement line having one end connected to an upper portion of the airborne particulate removing body, and the other end connected to the inlet so that harmful gases from which airborne particulates are primarily removed by the airborne particulate removing body, move to the inlet through the movement line.

* * * * *